United States Patent [19]
Iseki

[11] Patent Number: 4,598,452
[45] Date of Patent: Jul. 8, 1986

[54] TOOL FOR CONNECTING A PAIR OF PIPES THROUGH A COUPLING PIPE

[75] Inventor: Seiichi Iseki, Kagawa, Japan

[73] Assignee: Super Tool Co., Ltd., Osaka, Japan

[21] Appl. No.: 758,292

[22] Filed: Jul. 23, 1985

[30] Foreign Application Priority Data

Jul. 26, 1984 [JP] Japan .................. 59-114395[U]

[51] Int. Cl.[4] ............................................. B23P 19/04
[52] U.S. Cl. ........................................ 29/237; 29/267
[58] Field of Search .................................. 29/237, 267

[56] References Cited

U.S. PATENT DOCUMENTS

| | | | |
|---|---|---|---|
| 2,958,125 | 11/1960 | Nichols | 29/237 |
| 3,494,016 | 2/1970 | Evans | 29/237 |
| 3,653,115 | 4/1972 | Perkins | 29/237 |
| 3,688,378 | 9/1972 | Garvey | 29/237 |
| 4,493,139 | 1/1985 | McClure | 29/237 |
| 4,519,122 | 5/1985 | Miller | 29/267 |

Primary Examiner—James L. Jones, Jr.
Attorney, Agent, or Firm—Birch, Stewart, Kolasch & Birch

[57] ABSTRACT

A tool for connecting a pair of pipes through a coupling pipe includes a handle connected to a curved member, a semicircular plate connected rotatably with the curved member through a link, and a crescent-shaped plate extending from the curved member. The curved member has a supporting point at the ends of its bending portion and a point of application at the top of its projecting portion. The semicircular plate is connected rotatably with the supporting point through a pair of links, and fixed close to an edge of a coupling pipe so as to settle the tool. The crescent-shaped plate is connected rotatably at its neck portion with the point of application of the curved member through a pair of middle links. A pair of upper and lower portions of the crescent-shaped plate are adapted to engage with the pipe to be connected with offsetting to the axial direction of the pipe.

2 Claims, 12 Drawing Figures

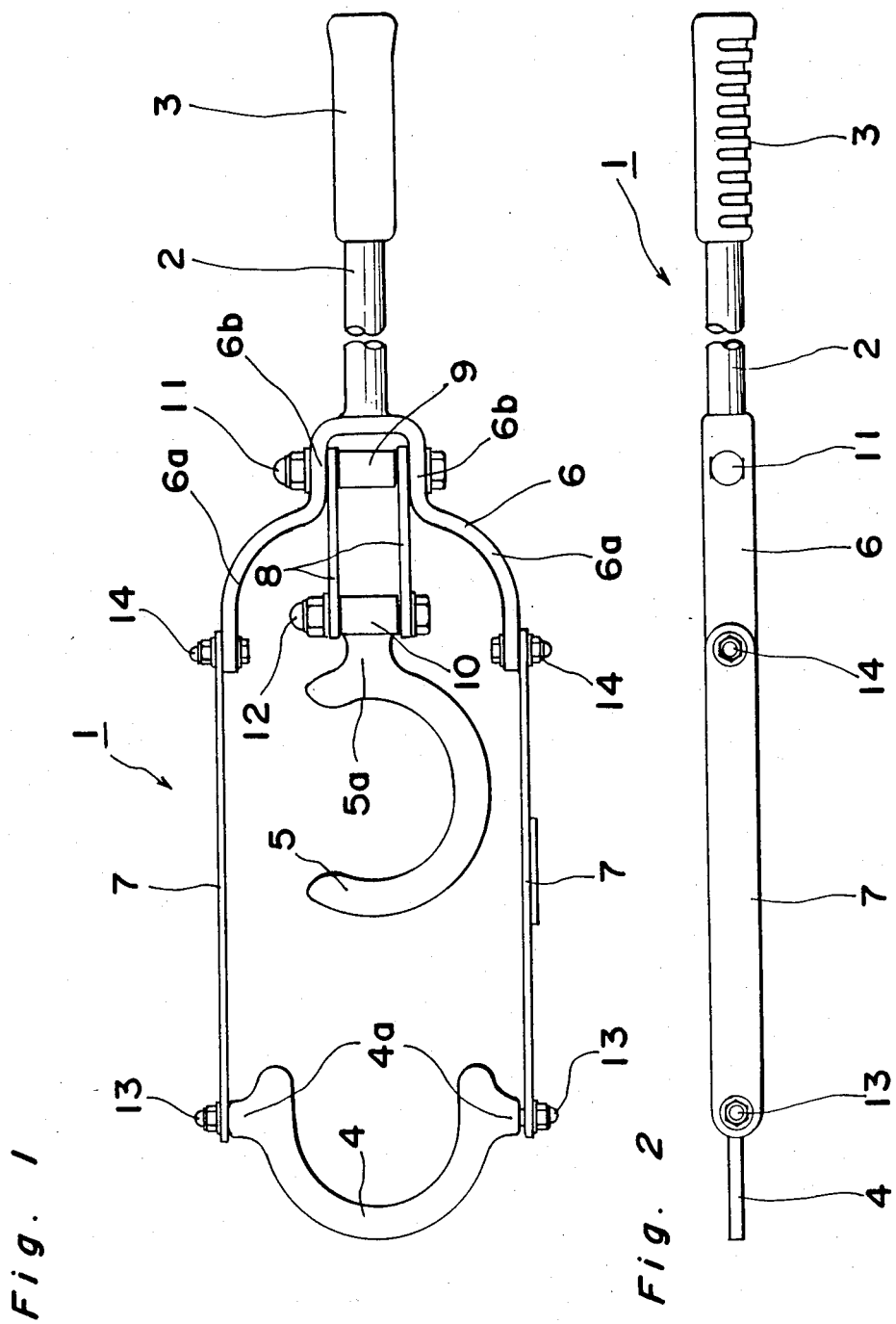

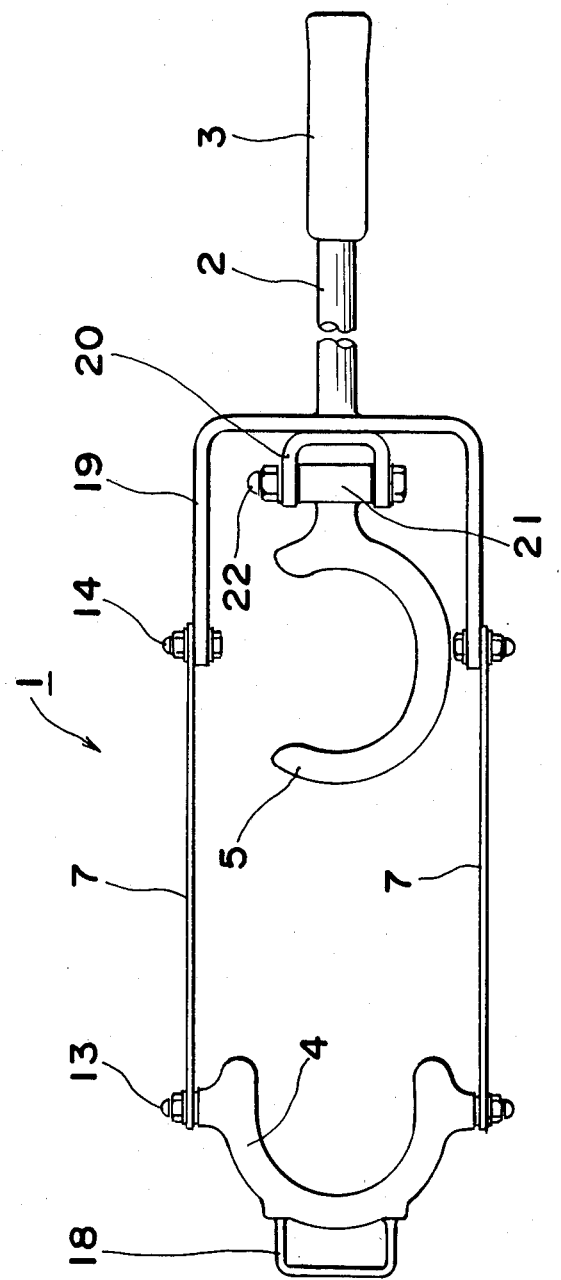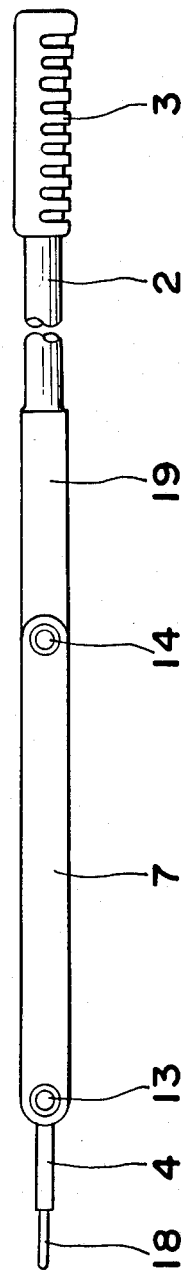
Fig. 6
Fig. 7

TOOL FOR CONNECTING A PAIR OF PIPES THROUGH A COUPLING PIPE

BACKGROUND OF THE INVENTION

1. Field of the Invention

The present invention relates to a tool for connecting a pair of pipes through a coupling pipe.

2. Description of the Prior Art

Conventionally, a pair of pipes have been connected manually through a coupling pipe by means of a mould and the like. By means, however, there are such disadvantages that it takes much time to connect long pipes, in particular, long pipes having large diameters and, the pipes are apt to be more easily broken.

SUMMARY OF THE INVENTION

Accordingly, it is an object of the present invention to provide a tool for connecting a pair of pipes through a coupling pipe, which eliminates the prior disadvantages as described above and is advantageous in that it is easy and quick to single-handedly connect a pair of pipes through a coupling pipe even in a small space.

In accomplishing the above object, according to one preferred embodiment of the present invention, there is provided a tool for connecting a pair of pipes through a coupling pipe, comprising a handle welded to a curved member, a semicircular plate placed close to an edge of a coupling pipe from the upper side so as to settle the tool onto pipes immovably, and a crescent-shaped plate extending from the curved member; said curved member mounted on a pipe to be connected and including a supporting point and a point of application, said crescent-shaped plate engaged with the pipe to be connected with offsetting of the axial direction of the pipe so as to pull the pipe into a coupling pipe strongly and firmly.

BRIEF DESCRIPTION OF THE DRAWINGS

This and other objects and features of the present invention will become apparent from the following description taken in conjunction with the preferred embodiments thereof with reference to the accompanying drawings, in which:

FIG. 1 is a top plan view of the tool of one preferred embodiment according to the present invention;

FIG. 2 is a side elevational view of the tool of FIG. 1;

FIG. 6 is a top plan view of another preferred embodiment according to the present invention; and FIG. 7 is a side elevational view of the tool of FIG. 6.

DETAILED DESCRIPTION OF THE INVENTION

Figure 3:
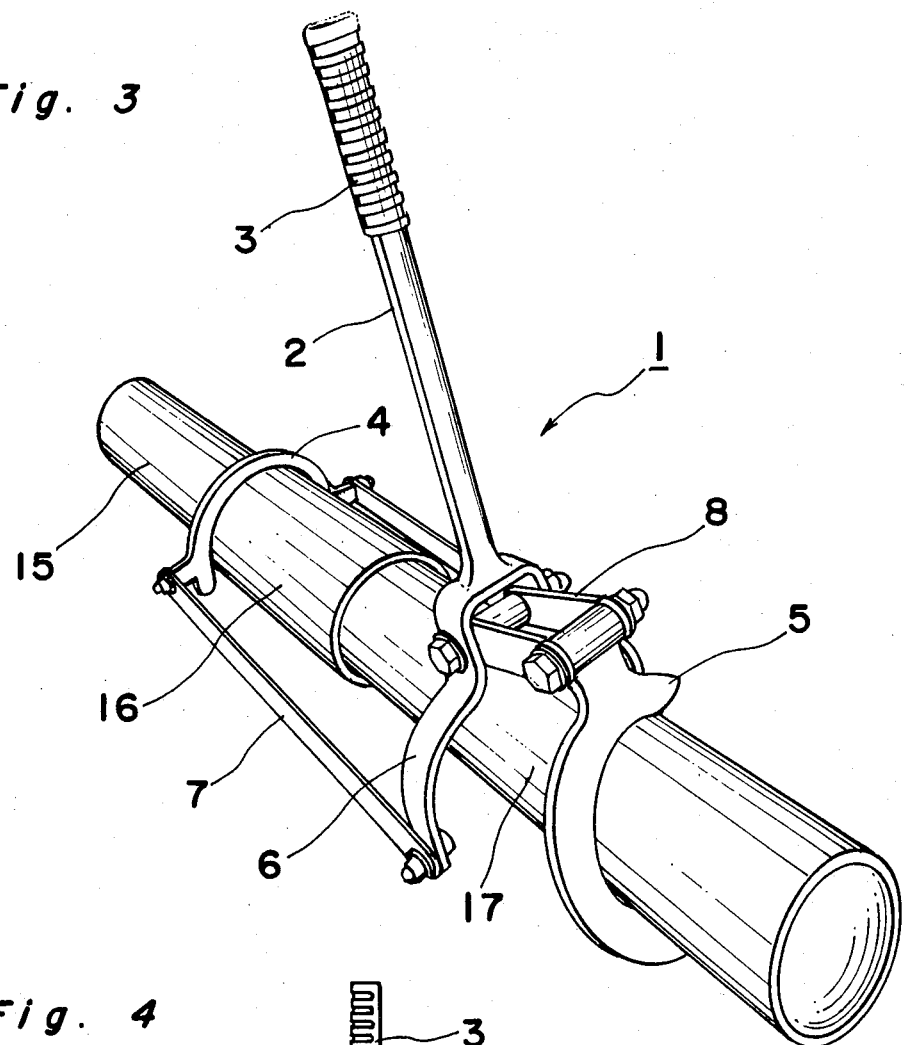
FIG. 3 is a perspective view of the tool according to the present invention, which shows an example of arranging the tool on pipes.

Before the description of the present invention proceeds, it is to be noted that like parts are designated by like reference numerals throughout the accompanying drawings.

Referring now to the drawings, there is shown in FIGS. 1 and 2 a tool 1 according to one preferred embodiment of the present invention, which generally includes a handle 2 connected to a curved member 6, a semicircular plate 4 connected with the curved member 6 through a pair of links 7 and placed close to an edge of a coupling pipe from the upper side, and a crescent-shaped plate 5 extending from the curved member 6 positioned offset to a pipe to be connected.

The handle 2 is in the shape of a stick made of steel having a predetermined length, comprising a grip 3 provided at the top end and a lower part welded to a curved member 6. Said grip 3 is made of plastic resin having a plurality of grooves, so that it is nonskid and easy to grip. Also, the grip 3 works as the first point of application.

The curved member 6 takes a divergent curved form, including a bending portion 6a and a projecting portion 6b. A distance between the bending portions 6a is longer than a diameter of a pipe so as not to touch the pipe, while a distance between the projecting portions 6b is shorter than a diameter of a pipe to be mounted on the pipe. The top of the projecting portion 6b is welded to the handle 2, and both ends of the bending portions 6a are connected rotatably with the link 7 by means of double-nutted bolts 12. Both ends of the bending portion 6a work as a supporting point and the top of the projecting point 6b works as the second point of application.

The semicircular plate 4 has an inner diameter slightly larger than a diameter of a pipe but smaller than that of a coupling pipe so as to be fixed close to an edge of a coupling pipe from the upper side. Moreover, the semicircular plate 4 includes projected side portions 4a, whereat the semicircular plate 4 is connected to the links 7 by means of stud bolts 13.

The crescent-shaped plate 5 has an inner diameter larger than a diameter of a pipe to be connected for being engaged with the upper and lower part of the outer surface of the pipe with offsetting to the axial direction of the pipe. And, the crescent-shaped plate 5 includes a neck portion 5a welded to a rotatable collar 10, so that the crescent-shaped plate 5 can be free to move.

A pair of links 7 are placed in parallel and have a definite length longer than a coupling pipe according to a size of a pipe in order to enable the most effective insertion of the pipe. Furthermore, a pair of links 7 link rotatably at both opposite sides the semicircular plate 4 by means of stud bolts 13 as well as the curved member 6 by means of double-nutted bolt 14.

A pair of middle links 8 are also placed in parallel with putting collars 9 and 10 between both opposite sides of themselves. Each of a pair middle links 8 is rotatably joined, at the one side, to an inner periphery of the projecting portion 6b of the curved member 6 by means of a through bolt 11 with nuts and washers at both ends. On the other hand, a pair of middle links 8 are connected at the other side to each other by means of a through bolt 12 with nuts and washers at both ends.

The collars 9 and 10 are rotatable and surround the through bolts 11 and 12 respectively. The collar 10 is welded to the crescent-shaped plate 5. The crescent-shaped plate 5 can, therefore, be rotated freely as the collar 10 rotates.

Figure 4:
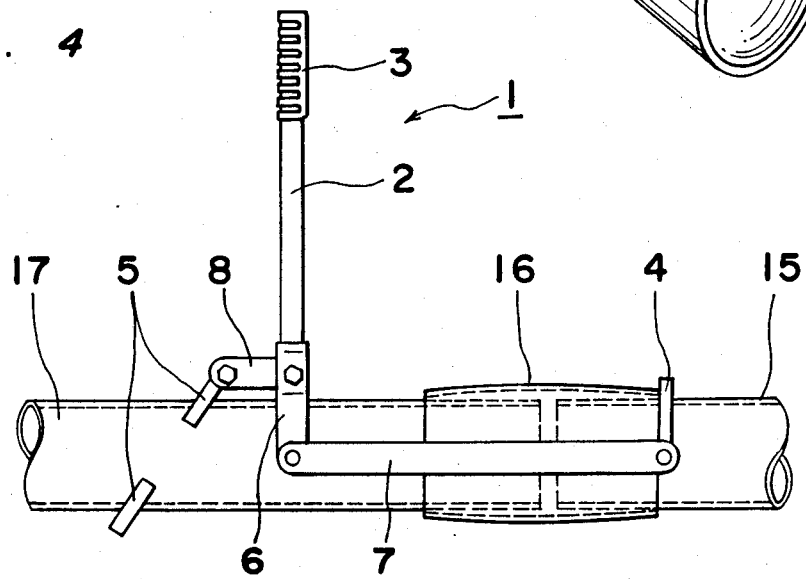
FIG. 4 is a schematic side elevational view of FIG. 3.

Referring to FIGS. 3 and 4, there is shown an example of an arrangement of pipes and the tool 1 according to the present invention, wherein a pipe 15 is previously bonded to one end of a coupling pipe 16 and a pipe 17 is to be inserted into the other end of a coupling pipe 16 by the tool 1. These pipes 15, 16 and 17 are all made of vinyl chloride resin. The pipes 15 and 17 are long pipes of the same diameter, but the coupling pipe 16 is larger in diameter than said pipes 15 and 17. Therefore, both edges of the coupling pipe 16 rise up to the pipes 15 and 17. Thus, the semicircular plate 5 is securely fixed to the edge of the coupling pipe 16 where the pipe 15 is previously bonded, so that the tool 1 is immovably settled. The crescent-shaped plate 4 having a diameter larger than the pipe 17 is engaged with the pipe 17 with offsetting to the axial direction of the pipe 17 and holds the upper and lower part of the outer surface of the pipe 17 with its upper and lower portion for giving a strong pull to the pipe 17.

It should be noted that the pipe 17 is forced into the coupling pipe 16 by an action of a lever. Accordingly, the handle 2 and the curved member 6 integrally play the part of a lever. The supporting point is on the point where the curved member 6 is connected with the links 7. The first point of application is on the grip 3 and the second point of application is on the point where the curved member 6 is connected with the middle links 8. The middle links 8 change the direction of force from the vertical direction of the pipe to the axial direction of the pipe. Thus, the pipe 17 is pulled in the axial direction of the pipe and forced into the coupling pipe 16.

Figure 5:
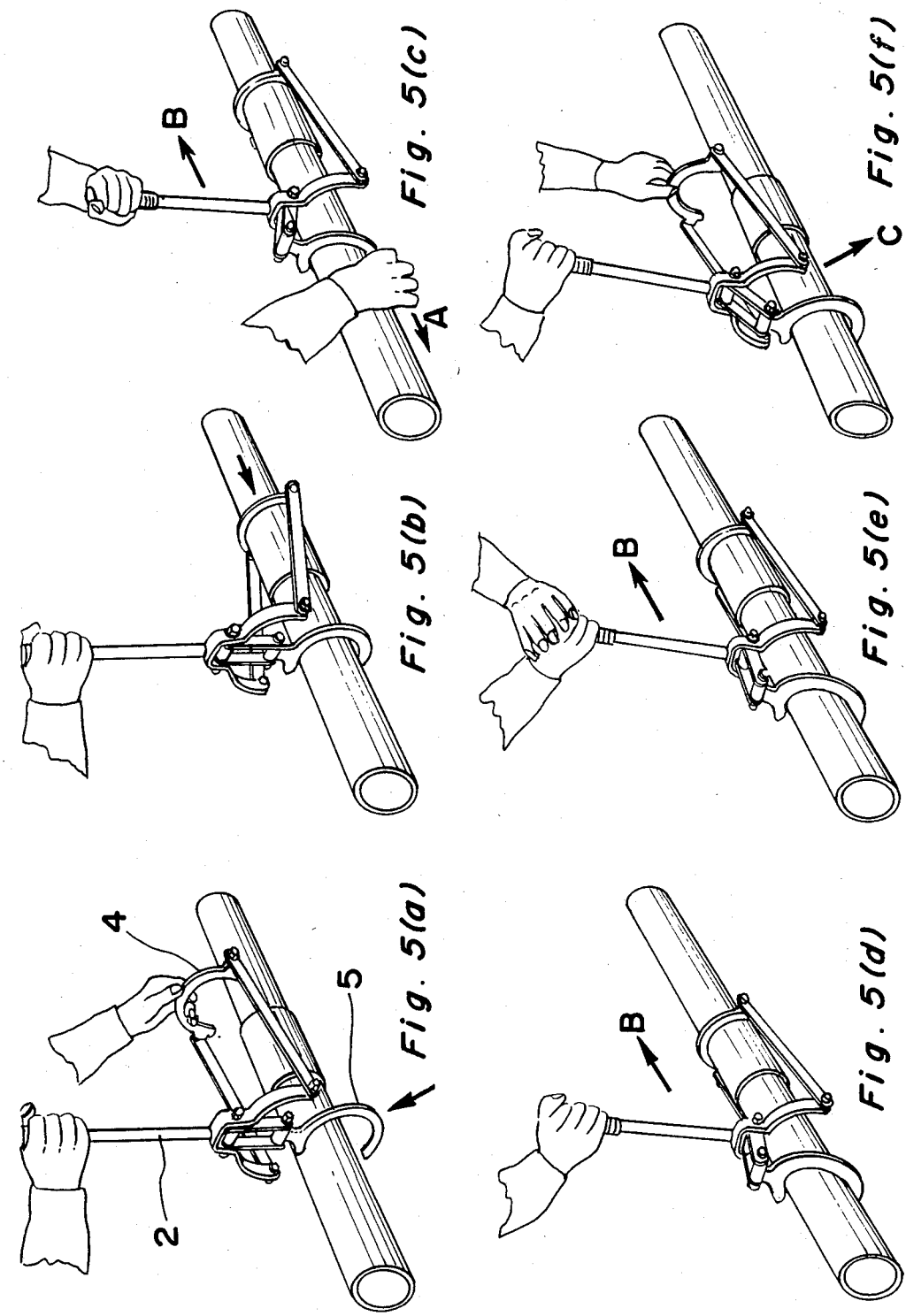
FIGS. 5(a) to 5(f) are perspective views showing the process in which a pair of pipes are connected by the tool according to the present invention.

The process in which the tool 1 is operated will be described with reference to FIGS. 5(a) to 5(f). FIG. 5(a) represents the first step in setting the tool 1. The handle 2 and the semicircular plate 4 are lifted by each hand, and the crescent-shaped plate 5 is attached to the pipe 17 from the side of the pipe 17 vertically. In this state, secondly, the semicircular plate 4 is put down on the pipe 15 to be fixed close to an edge of the coupling pipe 16, the edge being bonded with the pipe 15, as shown in FIG. 5(b). While the handle 2 is held by one hand, the crescent-shaped plate 4 is pulled to the direction A by the other hand until it is engaged with the pipe 17 with offsetting to the axial direction of the pipe. In this case, the handle 2 is preferably held vertically or a little inclined to the direction B as shown in FIG. 5(c). When the setting of the tool 1 is finished throughout, the pipe 17 is forced into the coupling pipe 16, as shown in FIG. 5(d), by pushing the handle 2 down towards the direction B. The force applied to the handle 2 travels to the crescent-shaped plate 5 through the projection portion 6b of the curved member 6 and a pair of middle links 8. As the crescent-shaped plate 5 is engaged with the pipe 17 as described above, the force is perfectly acted on the pipe 17. If the crescent-shaped plate 5 is not securely engaged with the pipe 17, the pipe 17 cannot be forced into the coupling pipe 16 completely at one time. In such a case, the operation in FIGS. 5(c) and 5(d) should be repeated. Next, in FIG. 5(e), the handle 2 must be kept on being pressed until the pipe 7 can adhere to the coupling pipe 16 for a while after the pipe 17 is forced into the coupling pipe 16. FIG. 5(f) illustrates how to remove the tool 1, wherein the handle 2 and semicircular plate 4 should be lifted and pushed out slightly to the direction C.

In addition, the crescent-shaped plate 5 can be turned to the right or the left selectively by turning the tool 1 upside-down, so that the tool 1 can be used even where either side of a working place is too narrow to set the tool 1.

FIGS. 6 and 7 indicate another preferred embodiment according to the present invention, wherein the semicircular plate 4 has a handle 18 and a U-shaped member 19 is employed instead of the curved member 6. The handle 18 is mounted on the bending portion of the semicircular plate 4. Furthermore, a pair of middle links 8 is replaced by a C-shaped member 20 provided at the center of the U-shaped member 19. The C-shaped member 20 includes a collar 21 and a through bolt 22. The collar 21 is rotatable and fastened between the C-shaped member 20 by means of the through bolt 22 and welded to the crescent-shaped plate 5.

In this case, the second point of application is on the point where the C-shaped member 20 is welded to the U-shaped member 19.

Although the present invention has been fully described by way of example with reference to the accompanying drawings, it is to be noted here that various changes and modifications will be apparent to those skilled in the art. Therefore, unless such changes and modifications depart from the scope of the present invention, they should be construed as being included therein.

What is claimed is:

1. A tool for connecting a pair of pipes through a coupling pipe into which one of the pipes is previously bonded at its one end, and the other of the pipes is adapted to insert forcibly from its other end, comprising:

a handle in the shape of a stick having a grip at the top end and at the other end a curved member including a supporting point and a point of application, the supporting point being positioned at the ends of the bending portion of the curved member and the point of application being positioned at the top of the projecting portion of the curved member;

a semicircular plate having an inner diameter slightly larger than the connecting pipe but smaller than the coupling pipe and connected rotatably at its projected side portions with the supporting point of the curved member through a pair of links having a length longer than the coupling pipe;

a crescent-shaped plate having an inner diameter larger than the pipe to be connected and connected rotatably at its neck portion with the point of application of the curved member, and provided with a pair of upper and lower portions which are adapted to engage with the upper and lower portions of the outer surface of the pipe to be connected with offsetting to the axial direction of the pipe;

the pair of portions of the crescent-shaped plate being positioned around the pipe to be connected in parallel to the handle along a line right to the axial direction of the pipes, while the semicircular plate is adapted to locate onto the connecting pipe so as to be attached to the edge of the coupling pipe.

2. A tool as claimed in claim 1, further comprising a middle link connected rotatably with the curved member at one end and at the other end with the crescent-shaped plate through a rotatable collar.

* * * * *